US011711598B2

(12) United States Patent
Liu et al.

(10) Patent No.: US 11,711,598 B2
(45) Date of Patent: Jul. 25, 2023

(54) VEHICULAR CAMERA WITH LENS DEFOGGING FEATURE

(71) Applicant: Magna Electronics Inc., Auburn Hills, MI (US)

(72) Inventors: Zhongyao Liu, Troy, MI (US); Yuesheng Lu, Farmington Hills, MI (US); Jonathan D. Conger, Berkley, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 297 days.

(21) Appl. No.: 16/830,535

(22) Filed: Mar. 26, 2020

(65) Prior Publication Data

US 2020/0314311 A1  Oct. 1, 2020

Related U.S. Application Data

(60) Provisional application No. 62/825,128, filed on Mar. 28, 2019.

(51) Int. Cl.
| | |
|---|---|
| *H04N 7/18* | (2006.01) |
| *H04N 23/52* | (2023.01) |
| *B60R 11/04* | (2006.01) |
| *B60S 1/02* | (2006.01) |
| *H04N 23/51* | (2023.01) |
| *H04N 23/55* | (2023.01) |
| *H04N 23/54* | (2023.01) |

(52) U.S. Cl.
CPC ............ *H04N 23/52* (2023.01); *B60R 11/04* (2013.01); *B60S 1/026* (2013.01); *H04N 23/51* (2023.01); *H04N 23/55* (2023.01); *H04N 23/54* (2023.01)

(58) Field of Classification Search
CPC .................................................. H04N 5/22521
USPC ......................................................... 348/148
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,889,555 A * | 3/1999 | Kawase | ............... H04N 5/2254 348/336 |
| 5,949,331 A | 9/1999 | Schofield et al. | |
| 9,233,641 B2 | 1/2016 | Sesti et al. | |
| 9,319,637 B2 | 4/2016 | Lu et al. | |
| 9,961,241 B2 | 5/2018 | Biemer | |
| 10,137,844 B2 | 11/2018 | Weinecke et al. | |

(Continued)

*Primary Examiner* — Leron Beck
(74) *Attorney, Agent, or Firm* — Honigman LLP

(57) ABSTRACT

A vehicular camera for a vehicular vision system includes a housing having a front housing portion and a rear housing portion, with the front housing portion including a lens barrel for accommodating a lens. A heating device is disposed at an outermost lens element of the lens. The heating device includes a pair of electrically conductive elements that are routed along the lens barrel for electrical connection to circuitry at a printed circuit board. An outer end of each of the electrically conductive elements is disposed at and in contact with a heating element at and in contact with the inner surface of the outermost lens element. When powered, the heating element heats the outermost lens element to evaporate moisture or condensation thereat. The camera is configured to be disposed at an exterior portion of a vehicle so as to have a field of view exterior of the vehicle.

18 Claims, 7 Drawing Sheets

(56) References Cited

U.S. PATENT DOCUMENTS

| | | | |
|---|---|---|---|
| 2002/0154243 A1* | 10/2002 | Fife | H04N 5/2252 |
| | | | 348/372 |
| 2006/0171704 A1* | 8/2006 | Bingle | H04N 5/2254 |
| | | | 396/419 |
| 2011/0025848 A1* | 2/2011 | Yumiba | B62D 15/029 |
| | | | 348/148 |
| 2012/0170119 A1* | 7/2012 | Chu | G03B 11/00 |
| | | | 359/512 |
| 2013/0242099 A1 | 9/2013 | Sauer et al. | |
| 2014/0298642 A1* | 10/2014 | Sesti | G02B 7/025 |
| | | | 29/592.1 |
| 2014/0373345 A1 | 12/2014 | Steigerwald | |
| 2015/0222795 A1 | 8/2015 | Sauer et al. | |
| 2015/0266430 A1 | 9/2015 | Mleczko et al. | |
| 2015/0321621 A1 | 11/2015 | Van Dan Elzen et al. | |
| 2015/0365569 A1 | 12/2015 | Mai et al. | |
| 2016/0037028 A1 | 2/2016 | Biemer | |
| 2016/0231527 A1* | 8/2016 | Tremblay | G01J 5/12 |
| 2016/0264064 A1 | 9/2016 | Byrne et al. | |
| 2016/0268716 A1 | 9/2016 | Conger et al. | |
| 2016/0272163 A1 | 9/2016 | Dreiocker et al. | |
| 2017/0133811 A1 | 5/2017 | Conger et al. | |
| 2017/0285335 A1* | 10/2017 | Moncino | G02B 27/0006 |
| 2017/0295306 A1 | 10/2017 | Mleczko | |
| 2017/0302829 A1 | 10/2017 | Mleczko et al. | |
| 2018/0017785 A1* | 1/2018 | Bulgajewski | H04N 5/2252 |
| 2018/0072239 A1 | 3/2018 | Wienecke et al. | |
| 2018/0207691 A1 | 7/2018 | Byrne et al. | |
| 2018/0338118 A1* | 11/2018 | Dellock | G02B 27/0006 |
| 2019/0113743 A1 | 4/2019 | Kumar | |
| 2020/0307455 A1 | 10/2020 | Liu et al. | |

\* cited by examiner

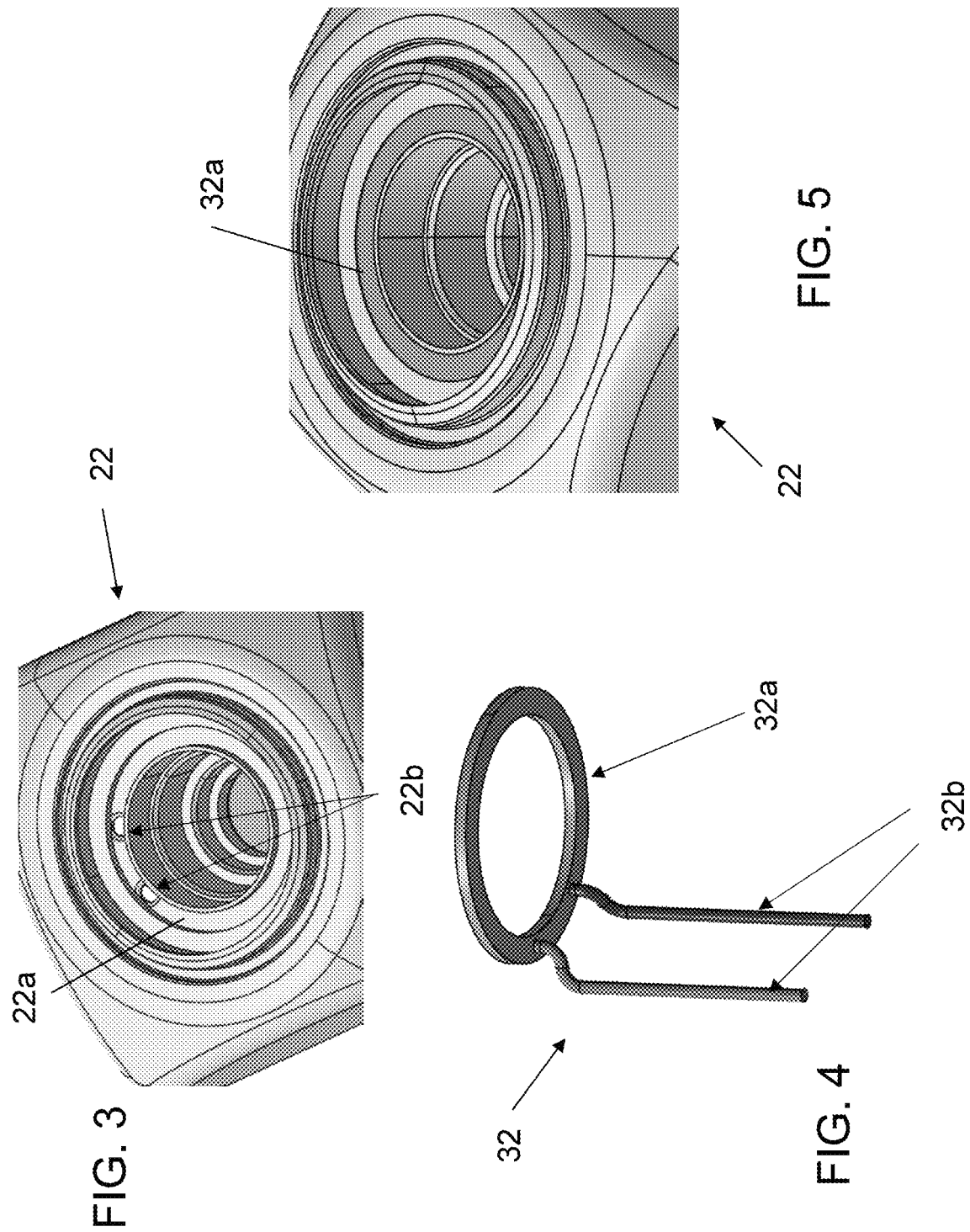

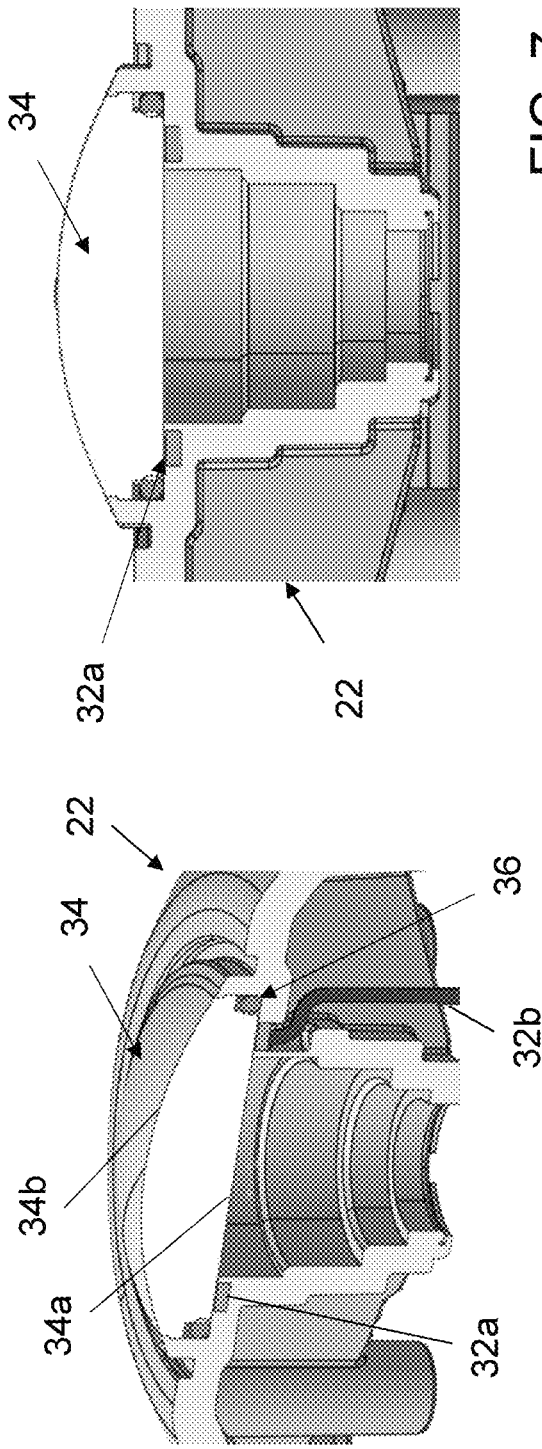
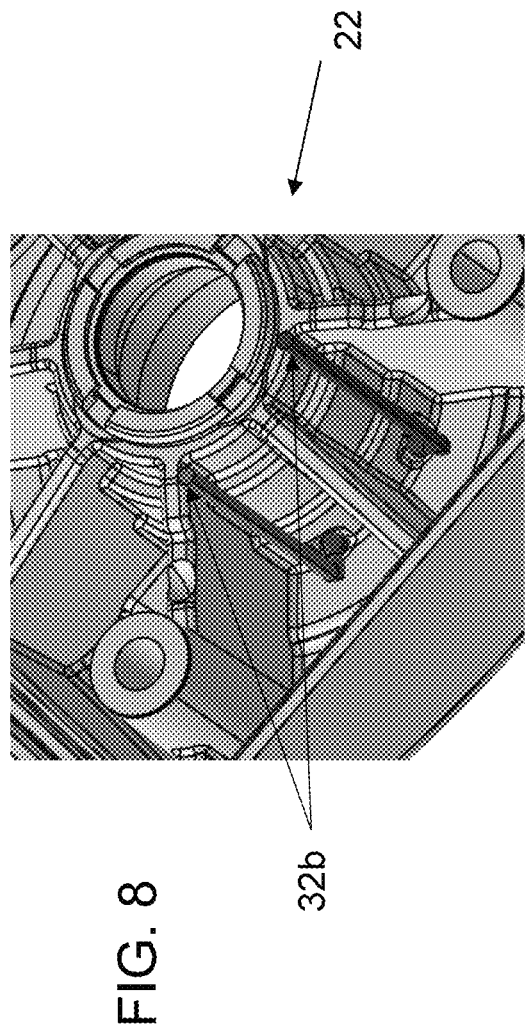
FIG. 7
FIG. 6
FIG. 8

VEHICULAR CAMERA WITH LENS DEFOGGING FEATURE

CROSS REFERENCE TO RELATED APPLICATION

The present application claims the filing benefits of U.S. provisional application Ser. No. 62/825,128, filed Mar. 28, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. For some applications, a lens heating function may be included within some cameras to defog the lens elements.

SUMMARY OF THE INVENTION

The present invention provides a vision system or imaging system or driving assist system or parking assist system for a vehicle that utilizes one or more cameras to capture image data representative of images exterior of the vehicle, and provides a heating element or function to defog the lens of the camera. The heating element comprises an electrically conductive heating ring that is disposed at or in an annular recessed surface at an outer part of the lens barrel such that, when an outermost lens element is disposed at the outer part of the lens barrel, the heating element contacts an inner surface of the outermost lens element to heat (when the heating element is energized or powered) the outermost lens element. The camera may be mounted or disposed at an exterior structure of the vehicle, such as, for example, a vehicle panel, grill, bumper, fascia, light bar, center high mounted stop lamp (CHMSL) or the like, with its lens present at the exterior structure and viewing exterior of the vehicle.

These and other objects, advantages, purposes and features of the present invention will become apparent upon review of the following specification in conjunction with the drawings.

BRIEF DESCRIPTION OF THE DRAWINGS

FIG. 3 is a perspective view of the front housing portion of the camera of FIG. 2, with the lens barrel removed to show additional details;

FIG. 4 is a perspective view of the heating element for the camera;

FIG. 5 is another perspective view of the front housing portion of FIG. 3, shown with the heating element disposed therein;

FIG. 6 is a perspective partial sectional view of the front housing portion of FIG. 4, shown with the outermost lens element disposed thereat;

FIG. 7 is a sectional view of the front housing portion of FIG. 6;

FIG. 8 is an inner perspective view of the front housing portion of FIG. 6;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
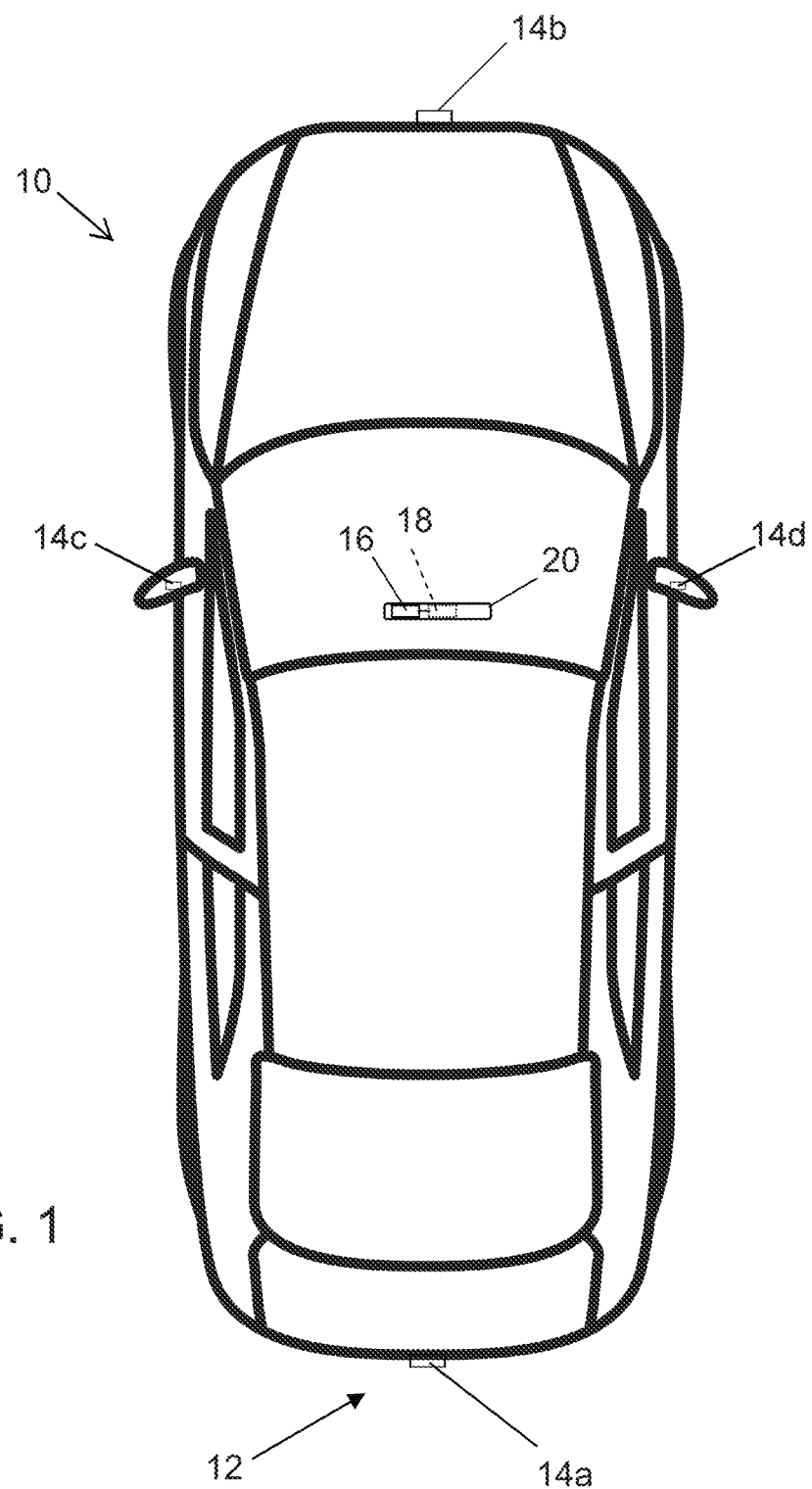
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
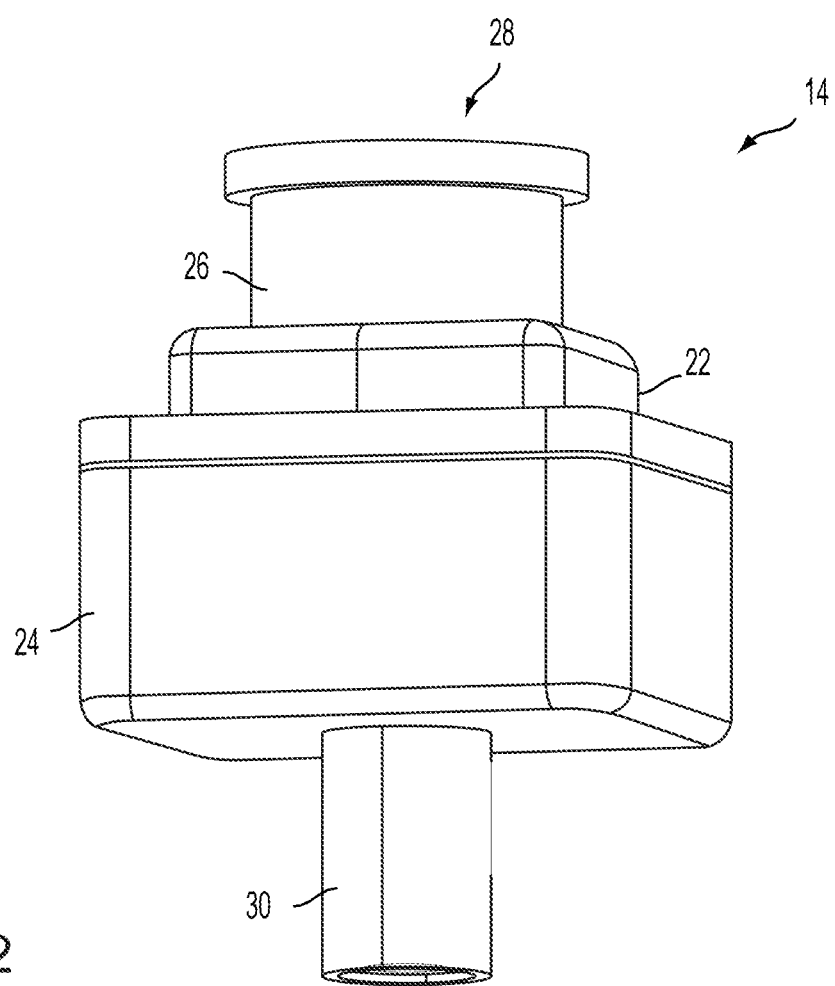
FIG. 2 is a perspective view of a camera suitable for use in the vision system.

As shown in FIG. 2, each camera 14 includes a front housing portion 22 and a rear housing portion 24, with the front housing portion 22 including a lens receiving portion 26 for receiving a lens 28 thereat, with the lens optically aligned with an imager. The rear housing portion 22 includes an electrical connector portion 30 (such as a multi-pin connector or a coaxial cable connector) for electrically connecting to a cable or wire harness of the vehicle when the camera is installed at the vehicle. The front and rear housing portions 22, 24 house the imager (disposed on a printed circuit board or PCB) and associated circuitry (disposed at the imager printed circuit board and/or at a second printed circuit board of the camera) for powering and controlling the camera and imager and a lens heating element 32 (FIG. 4). Because the camera is disposed at the vehicle exterior, the camera is exposed to cold temperatures and temperature and humidity fluctuations, whereby moisture and/or ice or snow may form or collect at the lens (such as at an inner and/or outer surface of the outermost lens element or optic element of the lens). Such automotive camera lenses are also susceptible to dirt or debris collecting at the lens of the camera. This is particularly an issue for cameras mounted at the front of a vehicle, such as at a front bumper or grill or fascia of the vehicle, or at the rear of the vehicle.

Such lens fogging issues may lead to customer complaints for poor visibility, or it can interfere with machine-vision camera visibility. Such lens fogging often occurs in low temperature conditions, and is often caused by condensation on the outside or outer surface of the first or outermost lens element if the temperature is lower than the dew point, and/or condensation on the inside or inner surface of the first or outermost lens element when the camera body is hotter than the lens (as may occur due to the PCB power heating the back side of the camera).

Condensation at the lens surface of the camera will reduce camera image quality and thus may be a high risk for advanced driving assist systems or autonomous vehicle control systems or the like. The camera 14 has its lens heated by a heating device 32 (such as a heating element or device that heats at least a portion of the outermost lens element of the camera). Heating the lens is an effective way to avoid the condensation on the lens surface.

The heating element 32 is provided to add a heating circuit in the lens barrel so as to heat the lens elements by direct contact with the outermost lens. Such a configuration provides enhanced heat transfer due to the close proximity of the heating element and the lens, and provides a low cost structure. The heating element is part of the lens barrel and can be integrated and controlled by the camera PCB (no external controller is required). The heating element is hidden from customer view so the camera appearance is not affected, and the heating element is integrated in the camera design so that the camera size is not affected.

The heating operation can be controlled within the camera PCB circuit or by an external unit such as a vehicle central computer. The camera may heat at startup, when certain ambient temperature conditions are present, or when condensation is detected through a dirty or occluded lens detection algorithm. When the water/condensation is heated it will vaporize. The vaporized water inside the lens can permeate the molecular structure of the plastic and evaporate to the ambient environment.

In the illustrated embodiment of FIGS. 3-8, the heating element 32 comprises a heating ring or coil 32a and a pair of wires or electrically conductive terminals or pins 32b. The heating ring may comprise any suitable heating element, such as a resistive electrically conductive element, such as a thin film resistance-based heating element (comprising a thin film or substrate with electrically conductive traces disposed thereat that heat when a current passes therealong). The lens holder or front housing portion 22 includes a recessed ring area or region 22a and a pair of apertures or passageways 22b at the recessed region 22a, whereby the heating ring 32a is disposed at the recessed region and the wires 32b pass through the openings 22b for electrical connection to circuitry at the PCB of the camera, as discussed further below. The heating ring 32a may have a pressure sensitive adhesive or the like to attach or secure the heating ring at the annular surface of the recessed region of the lens holder when the heating ring is disposed at the recessed region (FIG. 5).

With the heating ring 32a disposed at the recessed region, the outer surface of the heating ring is at or flush with the surface of the lens holder at which the inner surface 34a of the outermost lens element 34 rests (see FIGS. 6 and 7), such that the outer surface of the heating ring contacts the inner surface of the outermost lens element 34. Thus, when the heating element 32 is powered, the heating ring 32a generates heat to heat the outermost lens element 34 to reduce or evaporate condensation or moisture at the inner surface 34a and/or the outer surface 34b of the outermost lens element 34.

In the illustrated embodiment, an O-ring 36 is provided at the lens holder to prevent water from entering at the lens. Although not shown, the lens may comprise a plurality of lens optics, with the inner lens optics or lens elements disposed at the stepped parts of the lens holder of the front housing portion 22 (see, for example, FIG. 7). As shown in FIG. 8, the wires 32b are fed through the openings or holes and pass along the lens holder for connecting to the PCB in the camera or circuitry at the rear housing portion where the wires (and thus the heating element) receive power via electrical connection of the camera connector to a vehicle cable or wire harness.

Optionally, electrical connection to the heating ring or coil may be provided via electrically conductive traces or elements established along the inner surface of the lens holder part of the front housing portion. For example, and with reference to FIGS. 9-11, the front housing portion 122 of a camera may have slightly recessed channels along the inner surface of the lens barrel, whereby electrically conductive (e.g., metallic) coatings 132b are applied along the channels. The electrically conductive coatings may, for example, be established via physical vapor deposition (also known as vacuum metallization) or sputter coating or the like. During the coating process, the non-conductive areas of the lens barrel can avoid metallic plating by masking those areas or surfaces. Optionally, electrically conductive coatings can be established using "molded interconnect device" or MID technology that may apply traces by a two-shot or "laser direct structuring" method or the like (and such as by utilizing aspects of the cameras described in U.S. Pat. Nos. 10,137,844 and/or 9,961,241, which are hereby incorporated herein by reference in their entireties). In both cases, the channels allow the inner lens optics or lens elements to be placed in and along the lens barrel without scraping away the metallic layers.

Figure 10:
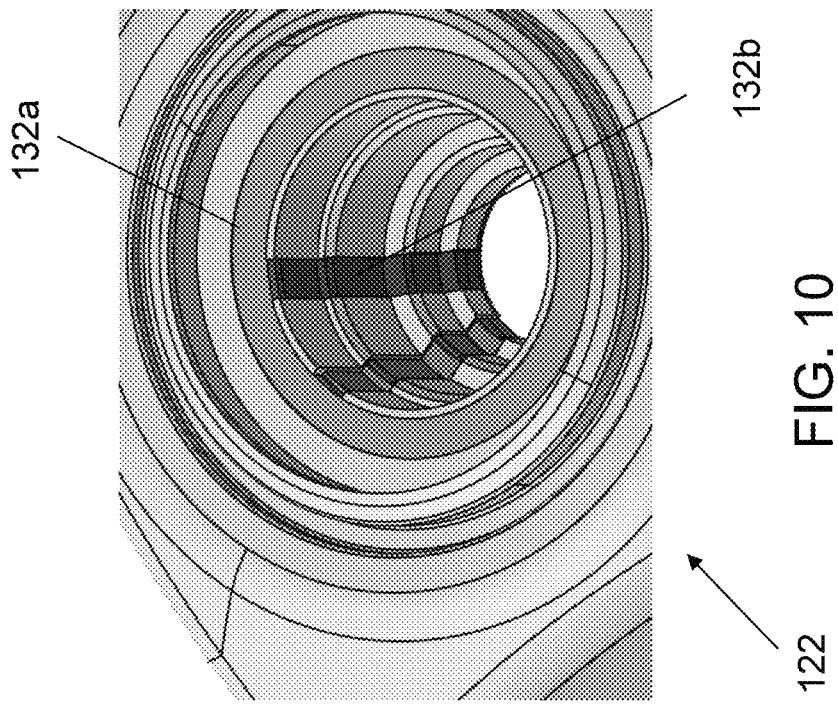
FIG. 10 is a perspective view of the front housing portion of FIG. 9, shown with the lens barrel removed to show the electrically conductive traces for powering the heating element.
Figure 9:
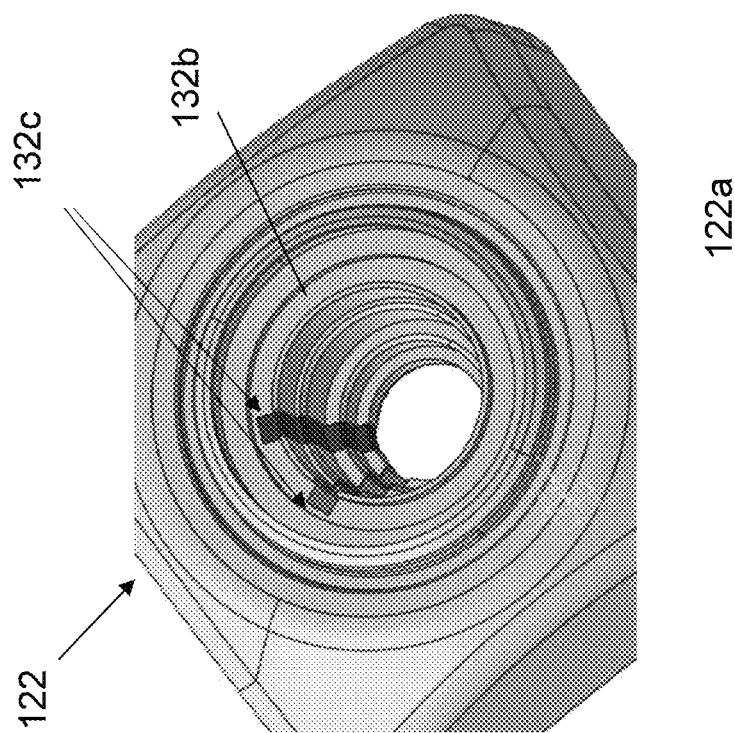
FIG. 9 is a perspective view of another front housing portion, shown with the lens barrel removed to show the electrically conductive traces for powering the heating element.
Figure 12:
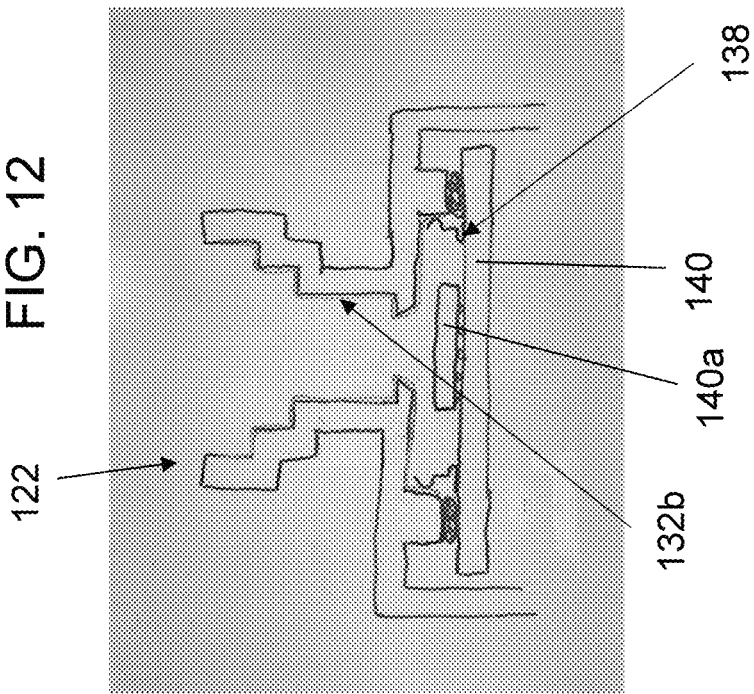
FIG. 12 is a sectional view of the camera assembly, showing electrical connection of the conductive traces to circuitry at an imager printed circuit board of the camera.
Figure 11:
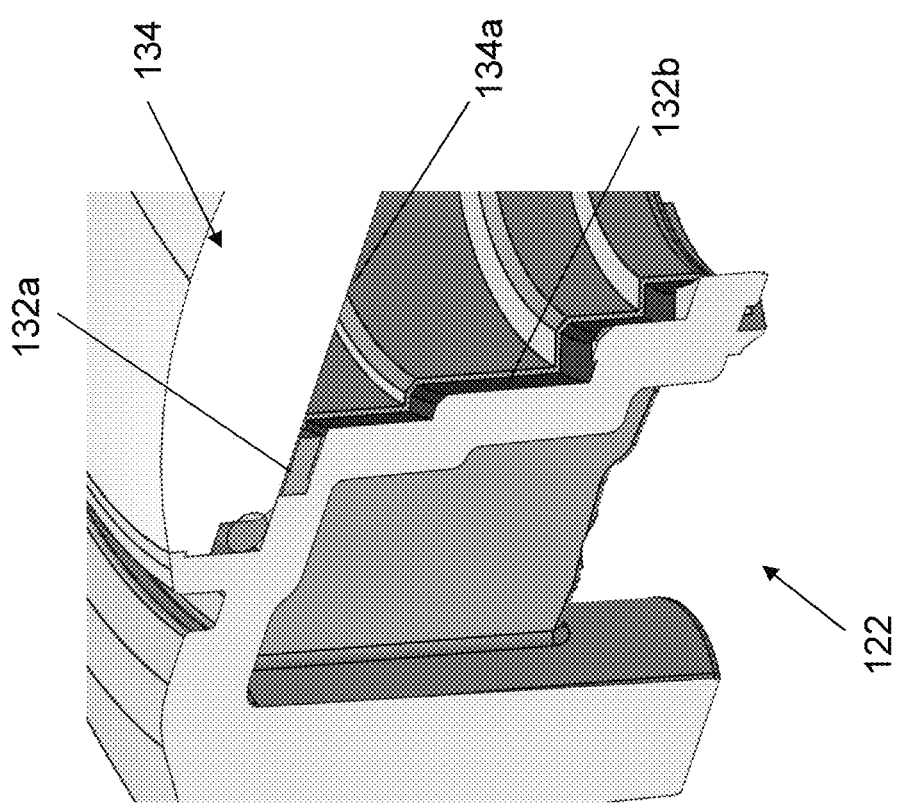
FIG. 11 is a perspective partial sectional view of the front housing portion of FIG. 9, shown with the heating element and the outermost lens element disposed thereat.
Figure 13:
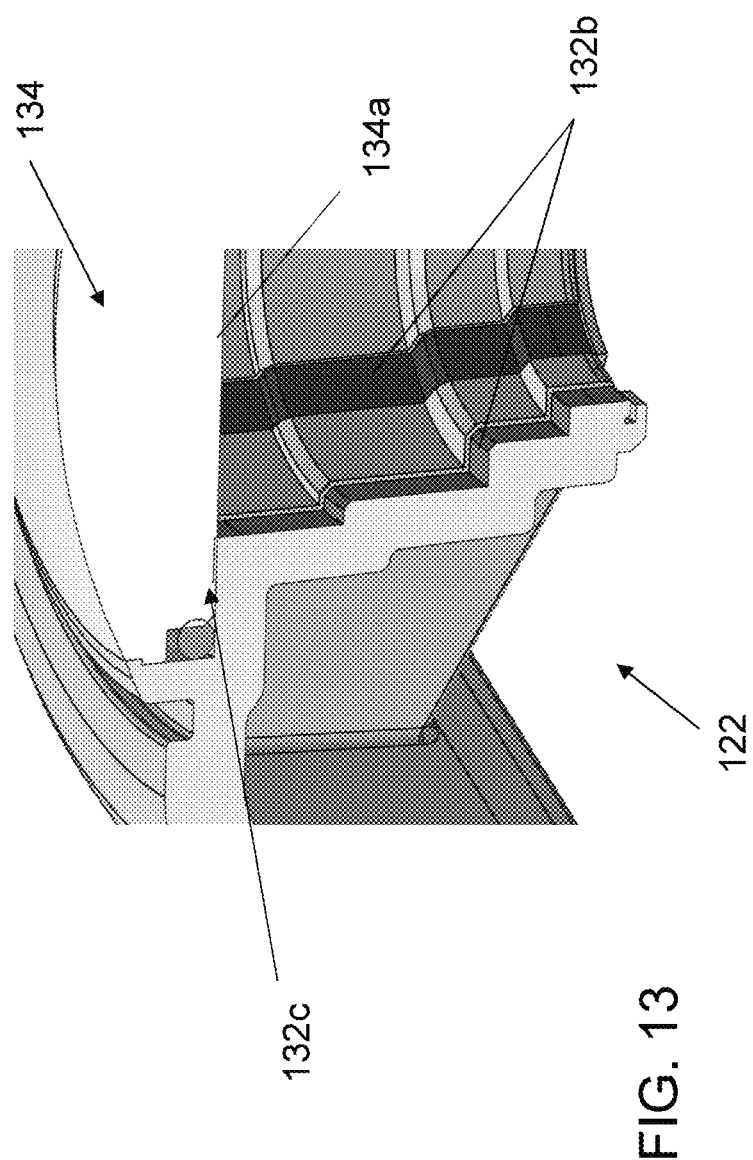
FIG. 13 is a perspective partial sectional view of another front housing portion, shown with the outermost lens element disposed thereat, with the heating element comprising an electrically conductive transparent coating at an inner surface of the outermost lens element.

As shown in FIGS. 9-11, the electrically conductive traces 132b terminate at pads 132c at the recessed ring region 122a, where they electrically conductively contact corresponding pads or connectors at the inner surface of the heating ring or coil 132a when the heating coil is disposed at the recessed region 122a. Optionally, and such as shown in FIG. 12, the conductive layers or traces may continue to the inside of the lens barrel and lens holder or front housing portion where they make electrically conductive contact with respective spring elements 138 at the PCB 140 to electrically connect to circuitry of the camera for receiving electrical power. The spring elements may react perpendicular or parallel to the PCB and may contact the respective traces at any point that is suitable for spring and coating placement. The spring elements comprise electrically conductive elements that are spring-biased or otherwise biased toward an extended state and that are compressed toward a compressed state when the PCB is moved into position at the front housing portion and when the imager is optically aligned with the lens during assembly of the camera. Thus, the electrical connection to the conductive traces 132b (via the spring elements 138) is made when the PCB is bonded or otherwise attached at the front housing portion 122 and when the lens is optically aligned with the imager 140a at the PCB 140.

Optionally, the heating coil 132a may be replaced by a sputtering or vapor deposition of electrically conductive material or metal, such as silver or indium tin oxide (ITO) or the like, at the inside glass surface 134a of the first or outermost lens element 134. The coating would be fine enough to be optically transparent. The contact pads 132c of the conductive traces 132b directly contact or touch the electrically conductive transparent coating at the inner lens surface at specific areas to introduce a voltage across the inner lens surface so as to directly heat the outermost lens element.

The cameras (with either the heating coil 132a or the coated outermost lens element) may otherwise be similar to the camera 14, discussed above, such that a detailed discussion of the cameras need not be repeated herein.

Thus, the present invention provides a heating system (and optionally a washer system too) that heats the outermost lens element, such as responsive to detection of a cold temperature below a threshold temperature or such as responsive to detection of lens occlusion or dirt or water at the lens or the like. For example, the heating module or device may be activated/deactivated by a system utilizing aspects of the lens heating device or system described in U.S. provisional application Ser. No. 62/825,083, filed Mar. 28, 2019, which is hereby incorporated herein by reference in its entirety.

The camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device.

The heating elements or circuits could be directly attached to a vehicle harness or be integrated into a camera pigtail if included in the design. Activation and control of the heating element may be via messages from the camera to the vehicle's communication network. Control could also be included in this device by way of integrated temperature sensor and timer. For example, a temperature sensor may be included at the camera or heater element such that, when the sensed temperature drops below a threshold temperature, the heating device is automatically activated to heat the lens barrel to limit or preclude moisture or ice forming on the lens optics.

The camera and/or system may utilize aspects of the cameras/systems described in U.S. Pat. Nos. 10,137,844; 9,961,241 and/or 9,319,637, and/or U.S. Publication Nos. US-2019-0113743; US-2018-0207691; US-2016-0272163; US-2015-0321621 and/or US-2016-0264064, which are hereby incorporated herein by reference in their entireties.

The spring-biased connecting elements and electrical connection between the circuitry of the PCB and the conductive traces or conductive elements may accommodate tolerances in the housing and/or PCB mounting and/or connector portion, while still providing and maintaining electrical connection during use of the camera on a vehicle. The camera and the spring-biased connecting elements and electrical connection between the circuitry of the PCB and the conductive traces or conductive elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera for a vehicular vision system, the vehicular camera comprising:
 a housing comprising a front housing portion and a rear housing portion;
 wherein the front housing portion includes a lens holder for accommodating a lens, wherein the lens is optically aligned with an imager disposed at a printed circuit board in the front housing portion;
 a heating device comprises (i) a heating element disposed at an outermost lens element of the lens and (ii) a pair of electrically conductive elements that are routed along the lens holder for electrical connection to circuitry at the printed circuit board;
 wherein an outer end of each of the electrically conductive elements is disposed at and in contact with the heating element at and in contact with an inner surface of the outermost lens element;
 wherein the electrically conductive elements comprise electrically conductive flat traces established along an inner surface of the lens holder and along part of an annular surface of the lens holder at which the outermost lens element is disposed;
 wherein the electrically conductive flat traces are established along respective channels established along the inner surface of the lens holder and along part of the annular surface of the lens holder at which the outermost lens element is disposed;
 wherein, when powered, the heating element heats the outermost lens element to evaporate moisture or condensation thereat; and
 wherein the vehicular camera is configured to be disposed at an exterior portion of a vehicle so as to have a field of view exterior of the vehicle.

2. The vehicular camera of claim 1, wherein the vehicular camera is configured to be fixedly mounted at the exterior portion of the vehicle.

3. The vehicular camera of claim 2, wherein, with the vehicular camera fixedly mounted at the exterior portion of the vehicle, the lens is exposed at the exterior portion of the vehicle.

4. The vehicular camera of claim 1, wherein the heating element comprises an electrically conductive ring that is disposed at a recessed region at the lens holder behind the outermost lens element.

5. The vehicular camera of claim 4, wherein the electrically conductive flat traces are established along part of the annular surface of the recessed region.

6. The vehicular camera of claim 5, wherein electrical connection between the electrically conductive flat traces and the circuitry is made via respective electrically conductive spring-biased elements disposed at and between the printed circuit board and a respective part of the front housing portion that has a portion of the electrically conductive flat traces established thereat.

7. The vehicular camera of claim 1, wherein the heating element comprises an electrically conductive coating established at the inner surface of the outermost lens element.

8. The vehicular camera of claim 1, wherein electrical connection between the electrically conductive flat traces and the circuitry is made via respective electrically conductive spring-biased elements disposed at and between the printed circuit board and a respective part of the front housing portion that has a portion of the electrically conductive flat traces established thereat.

9. The vehicular camera of claim 1, wherein electrical connection between an inner end of each of the electrically conductive flat traces and the circuitry is made via respective electrically conductive spring-biased elements disposed at and between the printed circuit board and the inner ends of the electrically conductive flat traces, and wherein the electrically conductive spring-biased elements are biased toward an extended state and are compressed toward a compressed state when the printed circuit board is disposed in the front housing portion and the lens is optically aligned with the imager disposed at the printed circuit board.

10. The vehicular camera of claim 1, wherein the heating element is at least partially disposed at the annular surface at an outer end region of the lens holder.

11. A vehicular camera for a vehicular vision system, the vehicular camera comprising:
 a housing comprising a front housing portion and a rear housing portion;
 wherein the front housing portion includes a lens holder for accommodating a lens, wherein the lens is optically aligned with an imager disposed at a printed circuit board in the front housing portion;
 wherein the lens holder comprises a stepped wall that circumscribes and supports a plurality of lens elements of the lens;
 a heating device comprises (i) a heating element disposed at an outermost lens element of the lens and (ii) a pair of electrically conductive elements that are routed along the lens holder for electrical connection to circuitry at the printed circuit board;
 wherein the outermost lens element is at least partially disposed at an annular surface of an outer end region of the lens holder, and wherein the heating element is at least partially disposed at the annular surface at the outer end region of the lens holder and in contact with an inner surface of the outermost lens element;
 wherein an outer end of each of the electrically conductive elements is disposed at and in contact with the heating element at and in contact with the inner surface of the outermost lens element;
 wherein the electrically conductive elements comprise electrically conductive flat traces established along an inner surface of the lens holder and along part of the annular surface of the lens holder at which the outermost lens element is disposed;
 wherein the electrically conductive flat traces are established along respective channels established along the inner surface of the lens holder and along part of the annular surface of the lens holder at which the outermost lens element is disposed;
 wherein, when powered, the heating element heats the outermost lens element to evaporate moisture or condensation thereat; and
 wherein the vehicular camera is configured to be disposed at an exterior portion of a vehicle so as to have a field of view exterior of the vehicle.

12. The vehicular camera of claim 11, wherein the heating element comprises an electrically conductive ring that is disposed at the annular surface of the outer end region of the lens holder.

13. The vehicular camera of claim 11, wherein the heating element comprises an electrically conductive coating established at the inner surface of the outermost lens element.

14. The vehicular camera of claim 11, wherein electrical connection between an inner end of each of the electrically conductive flat traces and the circuitry is made via respective electrically conductive spring-biased elements disposed at and between the printed circuit board and the inner ends of the electrically conductive flat traces, and wherein the electrically conductive spring-biased elements are biased toward an extended state and are compressed toward a compressed state when the printed circuit board is disposed in the front housing portion and the lens is optically aligned with the imager disposed at the printed circuit board.

15. A vehicular camera for a vehicular vision system, the vehicular camera comprising:
   a housing comprising a front housing portion and a rear housing portion;
   wherein the front housing portion includes a lens holder for accommodating a lens, wherein the lens is optically aligned with an imager disposed at a first side of a printed circuit board in the front housing portion;
   wherein the lens holder comprises a stepped wall that circumscribes and supports a plurality of lens elements of the lens;
   a heating device comprises (i) a heating element disposed at an outermost lens element of the lens and (ii) a pair of electrically conductive elements that are routed along the lens holder for electrical connection to circuitry at the printed circuit board;
   wherein the outermost lens element is at least partially disposed at an annular surface of an outer end region of the lens holder, and wherein the heating element is at least partially disposed at the annular surface at the outer end region of the lens holder and in contact with an inner surface of the outermost lens element;
   wherein an outer end of each of the electrically conductive elements is disposed at and in contact with the heating element at and in contact with the inner surface of the outermost lens element;
   wherein the electrically conductive elements comprise electrically conductive traces disposed along respective channels established along an inner surface of the stepped wall of the lens holder and along part of the annular surface at the outer end region of the lens holder;
   wherein, when powered, the heating element heats the outermost lens element to evaporate moisture or condensation thereat; and
   wherein the vehicular camera is configured to be disposed at an exterior portion of a vehicle so as to have a field of view exterior of the vehicle.

16. The vehicular camera of claim 15, wherein the heating element comprises an electrically conductive ring that is disposed at the annular surface of the outer end region of the lens holder.

17. The vehicular camera of claim 15, wherein the heating element comprises an electrically conductive coating established at the inner surface of the outermost lens element.

18. The vehicular camera of claim 15, wherein an inner end of each of the electrically conductive traces is disposed at an inner surface of the front housing portion that opposes the first side of the printed circuit board, and wherein electrical connection between the inner end of each of the electrically conductive traces and the circuitry is made via respective electrically conductive spring-biased elements disposed at and between the first side of the printed circuit board and the inner ends of the electrically conductive traces, and wherein the electrically conductive spring-biased elements are biased toward an extended state and are compressed toward a compressed state when the printed circuit board is disposed in the front housing portion and the lens is optically aligned with the imager disposed at the printed circuit board.

* * * * *